(12) United States Patent
Appel et al.

(10) Patent No.: US 6,489,064 B2
(45) Date of Patent: Dec. 3, 2002

(54) ELECTROLYTE SYSTEM FOR LITHIUM BATTERIES, THE USE THEREOF, AND METHOD FOR ENHANCING THE SAFETY OF LITHIUM BATTERIES

(75) Inventors: Wolfgang Appel, Kelkheim (DE); Sergej Pasenok, Kelkheim (DE); Juergen Besenhard, Graz (AT); Lars Henning Lie, Kornsjo (NO); Martin Winter, Seiersberg (AT)

(73) Assignee: Solvay Fluor und Derivate GmbH, Hannover (DE)

( * ) Notice: Subject to any disclaimer, the term of this patent is extended or adjusted under 35 U.S.C. 154(b) by 0 days.

(21) Appl. No.: 09/883,348

(22) Filed: Jun. 19, 2001

(65) Prior Publication Data

US 2002/0042003 A1 Apr. 11, 2002

Related U.S. Application Data

(63) Continuation of application No. PCT/EP99/09828, filed on Dec. 11, 1999.

(30) Foreign Application Priority Data

Dec. 19, 1998 (DE) .......................................... 198 58 925

(51) Int. Cl.$^7$ .............................................. H01M 10/40
(52) U.S. Cl. ........................ 429/339; 429/331; 429/336
(58) Field of Search .................................. 429/336, 339, 429/331

(56) References Cited

U.S. PATENT DOCUMENTS 4,439,503 A * 3/1984 Doddapaneni 5,385,794 A * 1/1995 Yokoyama et al.

FOREIGN PATENT DOCUMENTS

| CA | 2215849 | 9/1997 |
|----|---------|--------|
| EP | 0339284 | 6/1994 |
| EP | 850 920 | 7/1998 |
| EP | 902 492 | 3/1999 |
| GB | 2260137 | 4/1993 |

OTHER PUBLICATIONS

Patent Abstracts of Japan, vol. 1996, No. 4, Apr. 30, 1996, Abstract of JP 07–335255.
Patent Abstracts of Japan, vol. 1998, No. 10, Aug. 31, 1998, Abstract of JP 10–125352.

* cited by examiner

*Primary Examiner*—John S. Maples
(74) *Attorney, Agent, or Firm*—Crowell & Moring LLP

(57) ABSTRACT

Electrolyte systems for lithium batteries with enhanced safety containing at least one lithium-containing conductive salt and at least one electrolyte liquid, in which the electrolyte liquid includes an effective amount of at least one partially fluorinated amide of formula (I)

$$R^1CO\text{—}NR^2R^3 \qquad (I)$$

in which $R^1$ is a linear $C_1$–$C_6$ alkyl group, or a branched $C_3$–$C_6$ alkyl group, in which one or more hydrogen atoms are replaced by fluorine atoms; or a $C_3$–$C_7$ cycloalkyl group optionally substituted one or more times by a linear $C_1$–$C_6$ alkyl group and/or branched $C_3$–$C_6$ alkyl group, in which one or more hydrogen atoms of are replaced by fluorine atoms; and $R^2$ and $R^3$ independently represent an identical or different linear $C_1$–$C_6$ alkyl group, a branched $C_3$–$C_6$ alkyl group or a $C_3$–$C_7$ cycloalkyl group, or $R^2$ and $R^3$ together with the amide nitrogen form a saturated five or six-member nitrogen-containing ring.

17 Claims, No Drawings

ELECTROLYTE SYSTEM FOR LITHIUM BATTERIES, THE USE THEREOF, AND METHOD FOR ENHANCING THE SAFETY OF LITHIUM BATTERIES

CROSS REFERENCE TO RELATED APPLICATION

This application is a continuation of international application No. PCT/EP99/09828, filed Dec. 11, 1999, designating the United States of America, the entire disclosure of which is incorporated herein by reference.

BACKGROUND OF THE INVENTION

The invention relates to electrolyte systems for lithium batteries with enhanced safety, their use, and a method for enhancing the safety of lithium batteries.

Portable high-value electronic devices, such as mobile telephones, laptop computers, camcorders, etc. are enjoying a very fast growing market. An adequate electrical supply for these devices requires light, high-capacity and high-quality power sources. For environmental and economic reasons, secondary rechargeable batteries are overwhelmingly used. There are essentially three competing systems: nickel cadmium, nickel metal hydride, and lithium ion batteries.

A very interesting field of use, particularly for the latter battery system, could be that of electrically operated vehicles.

Due to its outstanding performance characteristics, the lithium battery has already acquired large market shares, although it was introduced in its current state of the art only in 1994. Despite the triumphant success of the secondary lithium battery, one cannot overlook the fact that from a safety aspect it still is susceptible to improvement with respect to certain requirements.

Rechargeable lithium batteries typically contain a lithium oxide and metal oxide compound as the cathode (e.g., $Li_xMnO_2$ or $Li_xCoO_2$) and lithium metal as the anode. The lithium is preferably used in the form of an intercalation compound with graphite or with carbon or graphite fibers. An overview of the use of such batteries is given by K. Brandt (Solid State Ionics 69 (1994), 173–183, Elsevier Science B.V.).

In accordance with the current state of the art, the electrolyte liquids, which are used to achieve high conductivity, are solvent mixtures of at least two or more components. The mixture must contain at least one strongly polar component, which due to its polarity has a highly dissociative effect on salts. The polar components that are typically used are ethylene carbonate or propylene carbonate. These highly polar solvents are relatively viscous and usually have a relatively high melting point, e.g., 35° C. for ethylene carbonate. To ensure adequate conductivity even at lower temperatures of use, one or more low-viscosity components are generally added as "thinners." Typical thinners include, for instance, 1,2-dimethoxyethane, dimethyl carbonate or diethyl carbonate. Usually the thinner is added in a proportion of 40–60% of the total volume. A serious problem of these thinner components is their high volatility and their low flash point. For instance, 1,2-dimethoxyethane has a boiling point (BP) of 85° C., a flash point (FP) of −6° C. and an explosion limit ranging from 1.6 to 10.4% by volume. The same parameters for dimethyl carbonate are: BP 90° C., FP 18° C. For these "thinners" there are currently no equivalent substitutes.

Since the electrochemical use of electrolyte solutions and, to a far greater extent, the occurrence of faults (short circuits, overcharging, etc.). always generates heat, this implies—particularly if a cell bursts open and solvent spills —a risk of ignition with correspondingly serious consequences. The currently used systems basically avoid this by costly electronic controls. Nevertheless, some accidents caused by fire have become known, particularly during manufacture where large amounts of solvents are handled, but also during the use of rechargeable lithium batteries.

A greater source of risk during use is created in electrical vehicle applications. Here, substantially greater amounts of electrolyte solution are required per energy storage device, and electronic control of many interconnected cells is far more difficult and involves correspondingly greater risks.

To enhance safety, the cathode and anode space can be separated by a microporous separator membrane, which is made in such a way that the current flow is interrupted by the melting of the pores when a certain temperature limit is exceeded.

The safety of lithium batteries can be further enhanced by pressure relief devices that respond to gas development if the battery is overcharged and, as mentioned above, by electronic monitoring and control devices.

Also recommended are flame-retardant additives containing phosphorus and halogen, which, however, often have a negative effect on the performance characteristics of the batteries.

All of these measures, however, cannot exclude that the highly volatile and flammable "thinners" are ultimately ignited in case of malfunctions and after rupture of the cell cause a fire that is difficult to control with common extinguishing agents. Burning lithium reacts violently not only with water but also with carbon dioxide, which is commonly found in commercially available extinguishers.

The following documents represent the state of the prior art:

JP-A-7 249432=D1
EP-A-0 631339=D2
EP-A-0 599534=D3
JP-A-10064584=D4
U.S. Pat. No. 5,169,736=D5
B. Scrosati, ed., 2nd International Symposium on Polymer Electrolytes, Elsevier, London and New York (1990)=D6
U.S. Pat. No. 5,393,621=D7
JP-A-6 020719=D8
U.S. Pat. No. 4,804,596=D9
U.S. Pat. No. 5,219,683=D10
JP-A-5 028822=D11, and
EP-A-0 821368=D12

D1 and D2, for instance, propose highly fluorinated ether as the electrolyte solvent or as additives to other electrolytes. In general, these substances are thermally and chemically very stable and have high flash points. However their solvent power is far too low for the required lithium electrolyte salts, so that they cannot be used alone, and they are poorly miscible with conventional battery solvents.

Partially fluorinated carbonates are also described as electrolytes having an increased flash point (D3). The problem here is that the compounds, which are apparently suitable based on their low viscosity, have only a moderately increased flash point (37° C.). Their electrical conductivities are clearly below those of the prior art, provided that the measurements disclosed in D3 were taken at room temperature, which is likely, since no measuring temperature was specified.

Amides are also described as thinners for anhydrous electrolytes, e.g., in D4. But the suitable representatives of this class of substances based on their higher boiling point and flash point, e.g., N,N-dimethylacetamide, are so viscous that they can at best be added in small percentages and do not act as a "thinner component" in the proper sense.

D8 discloses ester compounds of the formula $R^1COOR^2$ as electrolytes for secondary lithium batteries, in which at least one of the groups $R^1$ and $R^2$ has a fluorine substitution. A preferred compound is trifluoroacetic acid methyl ester. However, this compound has a boiling point of only 43° C. and a flash point of −7° C., which presents a high safety risk in case of damage.

According to the present state of the art, reduced flammability of the electrolyte solution is primarily achieved by increasing the viscosity of the electrolyte solution with the aid of binders or fillers or the use of polymer electrolytes, which are practically solid at room temperature.

D5, for instance, describes organic or inorganic thickeners (polyethylene oxide, $SiO_2$, $Al_2O_3$ and others) for solidifying liquid electrolyte solutions.

Polymer electrolytes composed of macromolecules with numerous polar groups, such as polyethylene oxide, as they are known from D6, are also far less flammable due to their low volatility.

One also frequently finds diacylated diols or monoacylated diol monoalkyl ethers in which the acyl component carries a double bond (i.e, is, for example, an acrylic or methacrylic acid) as the monomer components for the formation of such a gel-like polymer electrolyte. Examples of this include references D11 and D12.

D7 describes polymer electrolytes comprising polar macromolecules formed by polymerization of organophosphorus compounds, which are characterized by their particularly low flammability.

All of these gel-like to solid electrolytes have in common that due to their high viscosity, the mobility of the ions of the salts dissolved therein is far lower than in liquid electrolyte solutions. As a result, particularly at lower temperatures, the conductivities required for most technical applications are no longer reached.

D9 claims esters, such as methyl formate and methyl acetate, as thinner components. From a safety aspect, however, these substances offer no advantages since they also have low flash points and boiling points.

Finally, D10 proposes diol diesters as electrolyte components and, among these, especially 1,2-diacetoxyethylene as the preferred substance. Although this substance has clear advantages with respect to its flash point compared to the typical thinners, its viscosity is so high that one of the conventional thinners, such as dimethoxyethane, has to be added again to obtain the required conductivity.

Thus, despite the efforts of the prior art, there has remained a substantial need for improved electrolyte solvents.

SUMMARY OF THE INVENTION

One object of the invention, therefore, is to provide novel electrolyte solvents, which can be used alone or as additives to known electrolyte solvents.

Another object of the invention is to provide electrolyte solvents which are chemically and physically stable, are adequately miscible with other suitable solvents, and adequately dissolve conductive lithium salts.

A further object of the invention is to provide electrolyte solvents which have a clearly increased flash point while nevertheless exhibiting a viscosity and conductivity behavior that makes them suitable in practical applications even at low temperatures.

It is also an object of the invention, particularly in view of the increased significance of rechargeable lithium cells, is to provide electrolyte solvents or additives to known solvents, which do not jeopardize, or even enhance or at least promote, the recyclability of the components.

A still further object of the invention is to provide an electrolyte system for lithium batteries with enhanced safety.

Yet another object of the invention is to provide an electrolyte system which makes possible an enhanced secondary lithium battery with respect to its applicability and fitness for use; particularly a secondary lithium battery which meets all safety requirements in an outstanding manner.

From a process engineering point of view, it is an object of the present invention to make secondary lithium batteries safer without significantly impairing their other properties.

Furthermore, an additional object of the invention is to provide a method which makes secondary lithium batteries safer without negatively influencing the stability and/or conductivity of the cells.

A final object of the invention was to specify the use of electrolyte solvents or additives.

These and other objects, which are not further defined but are readily apparent from the introductory discussion, or which can be readily derived from the introduction, are achieved in accordance with the present invention by providing an electrolyte system of the type described above which has the features described hereinafter.

Advantageous preferred modifications of the electrolyte system according to the invention are also described hereinafter.

In accordance with another aspect, the objects of the invention are achieved by providing a method for enhancing the safety of lithium batteries, and described hereinafter.

Advantageous preferred applications are also described.

By providing an electrolyte system for lithium batteries which contains an effective amount of at least one partially fluorinated amide corresponding to formula (I)

$$R^1CO\!-\!NR^2R^3 \qquad\qquad (I)$$

wherein $R^1$ is
a linear $C_1$–$C_6$ alkyl group, in which one or more hydrogen atoms are substituted by fluorine atoms, or
a branched $C_3$–$C_6$ alkyl group in which one or more hydrogen atoms are substituted by fluorine atoms, or
a $C_3$–$C_7$ cycloalkyl group optionally substituted one or more times by a linear $C_1$–$C_6$ alkyl group and/or branched $C_3$–$C_6$ alkyl group, in which one or more hydrogen atoms of the cycloalkyl radical and/or the optional linear and/or branched alkyl substituent groups are substituted by fluorine atoms; and $R^2$ and $R^3$
independently represent an identical or different linear $C_1$–$C_6$ alkyl group, a branched $C_3$–$C_6$ alkyl group or a $C_3$–$C_7$ cycloalkyl group, or together with the amide nitrogen form a saturated five or six-membered nitrogen-containing ring, or with one or more additional N and/or O atom(s) form a 4 to 7-membered ring, wherein the additional N atoms present in the ring are optionally saturated with $C_1$–$C_3$ alkyl groups and the ring carbon atoms may also carry $C_1$–$C_3$ alkyl groups;

it is possible, in a particularly advantageous and not readily foreseeable manner, to provide an electrolyte, which exceeds, or is at least equivalent to, the known electrolyte systems for lithium batteries within the usual requirement spectrum and at the same time provides increased safety compared to the prior art systems.

In particular, it was surprisingly found that electrolyte systems for lithium batteries with the addition of partially fluorinated amide of general formula I meet the following requirements to an outstanding degree:

high thermal stability high flash point low vapor pressure high boiling point low viscosity miscibility with the usual solvents used for batteries, particularly with ethylene carbonate, propylene carbonate or lactones, e.g., g-butyrolactone adequate solubility for fluorine-containing conductive lithium salts, e.g., $LiPF_6$, $LiN(SO_2CF_3)_2$ or $LiC(SO_2CF_3)_3$ high stability with respect to metallic lithium high decomposition voltage good film-forming properties. The initial formation of suitable protective films on the electrodes is a very important function for the life of the battery.

good solvent power for carbon dioxide: $CO_2$ accelerates the formation of protective films on lithium and $LiC_n$ anodes good solvent power for $SO_2$: $SO_2$ enhances the conductivity over the entire temperature range—which is particularly important at lower temperatures—and the formation of protective films on the electrodes.

Another essential advantage of the solvents according to the invention is that they are not miscible with water at all or only to a minor extent. As a result, they can be readily separated from the conductive salt and the polar components and recovered for the necessary recycling of used cells.

The term "linear $C_1$–$C_6$ alkyl," "linear $C_1$–$C_6$ alkyl group" or "straight chain alkyl group with 1 to 6 carbon atoms" comprises the groups methyl, ethyl, n-propyl, n-butyl, n-pentyl and n-hexyl; preferably the groups methyl, ethyl, n-propyl, n-butyl and n-hexyl; and particularly preferably the groups methyl, ethyl, n-propyl and n-butyl.

The term "branched $C_3$–$C_6$ alkyl," "branched $C_3$–$C_6$ alkyl group" or "branched alkyl group with 3 to 6 carbon atoms" comprises, among others, the groups isopropyl, isobutyl(2-methylpropyl), sec-butyl(1-methylpropyl), tert-butyl(1,1-dimethylethyl), 1-methylbutyl, 2-methylbutyl, isopentyl(3-methylbutyl), 1,2-dimethylpropyl, tert-pentyl(1,1-dimethylpropyl), 2,2-dimethylpropyl, 3,3-dimethylpropyl, 1-ethylpropyl, 2-ethylpropyl, as well as the branched hexyls, particularly, among others, 1-methylpentyl, 2-methylpentyl, 3-methylpentyl, 4-methylpentyl, 1,1-dimethylbutyl, 2,2-dimethylbutyl, 3,3-dimethylbutyl, 1,2-dimethylbutyl, 1,3-dimethylbutyl, 2,3-dimethylbutyl, 1-ethylbutyl, 2-ethylbutyl, 3-ethylbutyl, 1,1,2-trimethylpropyl, 1,2,2-trimethylpropyl, 1-methyl-1-ethylpropyl, 1-ethyl-2-methylpropyl; preferably the groups isopropyl, isobutyl(2-methylpropyl), sec-butyl(1-methylpropyl), tert-butyl(1,1-dimethylethyl), 1-methylbutyl, 2-methylbutyl, isopentyl(3-methylbutyl), 1,2-dimethylpropyl, tert-pentyl(1,1-dimethylpropyl), 2,2-dimethylpropyl, 3,3-dimethylpropyl, 1-ethylpropyl, 2-ethylpropyl; and especially preferably the groups isopropyl, isobutyl (2-methylpropyl), sec-butyl(1-methylpropyl), and tert-butyl(1,1-dimethylethyl).

The term "$C_3$–$C_7$ cycloalkyl" or "$C_3$–$C_7$ cycloalkyl group" comprises cyclopropyl, cyclobutyl, cyclopentyl, cyclohexyl, cycloheptyl; preferably cyclopropyl, cyclobutyl, cyclopentyl, cyclohexyl; advantageously cyclobutyl, cyclopentyl;

"$C_1$–$C_6$ alkyl," without specifying linear or branched, in principle comprises linear as well as branched groups, preferably the linear groups, "Groups $R^2$ and $R^3$ together with the amide nitrogen forming a saturated five or six-membered nitrogen-containing ring," represents particularly pyrrolidinyl and piperidinyl;

"Groups $R^2$ and $R^3$ bonded to a 3 to 7-membered ring with one or more additional N and/or O atoms" include, for example, oxaziridinyl, diaziridinyl, 1.3-oxzetidinyl, 1.3-diazetidinyl, oxazolidinyl, diazolidinyl, morpholinyl (tetrahydro-1.4-oxazinyl), tetrahydro-1.4-diazinyl;

In the context of the invention, partially fluorinated compounds or groups are groups in which at least one but not all of the carbon-bonded hydrogen atoms of the corresponding compound or the corresponding group are replaced by fluorine.

In the context of the invention, perfluorinated compounds or groups are compounds or groups in which all carbon-bonded hydrogen atoms of the compound or group are replaced by fluorine.

The electrolyte systems for lithium batteries according to the invention with enhanced safety, which comprise at least one conductive lithium-containing salt and at least one electrolyte liquid, contain "an effective amount" of one or more compounds corresponding to formula 1. In the context of the invention, this is to be understood as an amount of partially fluorinated amide of formula I sufficient to construct a serviceable and operational secondary lithium battery. The invention solves the safety problem of secondary lithium batteries by using compounds of formula I as essential components of the electrolyte system.

In principle, the compounds according to the invention are characterized by the presence of a di-alkyl substituted amide of an acid in which the alkyl group of the acid, in particular, contains one or more fluorine atoms.

An electrolyte system with outstanding performance characteristics also results from a content of one or more of compounds of formula I, where $R^1$ is a partially fluorinated or perfluorinated straight chain alkyl group with 1 to 4 carbon atoms or a partially fluorinated or perfluorinated branched alkyl group with 3 or 4 carbon atoms.

In another advantageous embodiment, an electrolyte system contains compounds of formula I, wherein group $R^1$ has the composition $C_nH_{2n+1-m}F_m$, where n=1 to 6 and m=1 to 13. Among these electrolyte systems, the systems in which the group $R^1$ has the composition $C_nH_{2n+1-m}F_m$, where n=1 to 4 and m=1 to 9, are particularly advantageous.

Of particular interest among the compounds of formula I are those, among others, in which the groups $R^2$ and $R^3$ in formula I represent an identical or different linear $C_1$–$C_4$ alkyl group or a branched $C_3$–$C_4$ alkyl group.

Electrolyte systems containing compounds of formula I in which one or both of the groups $R^2$ and $R^3$ represent identical or different cyclopropyl and/or cyclobutyl groups can also be advantageous.

If the groups $R^2$ and $R^3$ are cyclized, the resulting ring contains at least one nitrogen atom and is completely saturated. $R^2$, $R^3$ thus are thereby cyclized via methylene groups —$(CH_2)_n$—, where n is 4 or 5. The ring may carry $C_1$-$C_3$ alkyl substituents. The ring may contain oxygen or $C_1$-$C_3$ alkyl substituted nitrogen atoms, for instance in —$(CH_2)_m$—O—$(CH_2)_p$— or in —$(CH_2)_m$—N(alkyl)—$(CH_2)_p$— where m, p=1, 2 or 3 and m+p=4 or 5. Furthermore, one or more hydrogen atoms may be replaced by fluorine.

Particularly advantageous electrolyte systems are obtained if the system contains compounds of formula I in which the groups $R^2$ and $R^3$ are joined to form a 5 or 6-membered ring either directly or with an additional N or O atom.

According to the invention, the solution to the safety problem of secondary lithium batteries is to use compounds of formula I as essential components of the electrolyte system. Use is also made of their comparatively favorable viscosity.

The substances of general formula I may be used as thinners for fire-resistant, highly viscous components, for instance, ethylene carbonate and propylene carbonate. This makes it possible to produce aprotic electrolyte systems that are scarcely flammable.

Preferably, an electrolyte system according to the invention also contains an effective quantity of a film former, such as ethylene sulfite.

Particularly good results may also be obtained if, in addition to the combination of ethylene carbonate or propylene carbonate and a compound of general formula I, a film former is added, e.g., ethylene sulfite. In this type of mixture, it is even possible to use graphite electrodes with propylene carbonate, which would otherwise cause the electrode to be destroyed.

In a special embodiment of the invention, the content of amides of formula (I) amounts to 2 to 100%, preferably 2 to 70%, advantageously 3 to 40% by volume in relation to the entire volume of the electrolyte system. This implies that amides of formula (I) can be used as the sole solvent but also as a thinner in a secondary lithium battery.

The compounds according to formula I in pure form can not only be used alone as safety electrolyte liquids for non-aqueous battery systems, they can also be used in combination with known electrolyte liquids, such as carbonates, esters, lactones, nitrites and the like in the form of electrolyte liquid systems or combinations. To further increase the conductivity over the entire temperature range and further improve protective film formation on the electrodes, they may contain certain additives (e.g., ethylene sulfite or certain gases).

If the proportion of the amides of formula I to be used according to the invention in the electrolyte system of a secondary lithium battery is less than 2% by volume, the aforementioned advantages are not as pronounced. Typically, the content is 3 to 50% by volume, preferably 3 to 40% by volume relative to the total volume of the electrolyte system. In the lower concentration range, the film forming properties are in the foreground, whereas at higher concentrations, the other advantageous characteristics discussed above become more pronounced.

Based on the above discussion, highly advantageous modifications of the electrolyte system according to the invention are obtained, if apart from the content of at least one amide of general formula (I), an additional content of ethylene carbonate and/or propylene carbonate is present.

The partially fluorinated amides according to Formula I also enhance the solvent power for non-polar or slightly polar gases, particularly $CO_2$, $N_2$, $N_2O$, $SF_6$, $SO_2FCl$ or $SO_2F_2$. These gases can advantageously be used as a protective gases in lithium batteries, since they have a positive effect on the reactions occurring at the electrode/electrolyte interface [cf. J. O. Besenhard et al., J. Power Sources, 44 (1993), 413].

Of particular interest are electrolyte systems for secondary lithium batteries according to the invention in which $SO_2$ or $CO_2$ is used as a protective gas, respectively systems that are saturated with $SO_2$ or $CO_2$. This supports distinctly advantageous protective film formation on the electrodes.

Particularly advantageous systems also result if they are composed of the components conductive salt, partially fluorinated amide of formula I, ethylene carbonate and/or propylene carbonate, and $SO_2$ or $CO_2$.

Further, the high solvent power for non-polar gases has the additional safety advantage that it can reduce the pressure buildup within the cell when gaseous electrolyte decomposition products are formed.

Particularly advantageous systems result also if they are composed of the components conductive salt, partially fluorinated amide of formula I, ethylene and/or propylene carbonate, and 2–20% by volume of an additional film forming component, such as ethylene sulfite.

The compounds of formula I are commercially available in some cases, can partly be synthesized according to methods known from the literature or produced according to modified methods of the literature, and are thus available. The starting material is an ester or anhydride, preferably trifluoroacetic acid ester or anhydride, which is reacted with the appropriate corresponding secondary amine.

DETAILED DESCRIPTION OF PREFERRED EMBODIMENTS

Table 1 summarizes the physical properties of some examples of amides of formula I. For comparison purposes, dimethylacetamide is given as a substance of the prior art.

TABLE 1

| Compound | BP °C. | FP °C. | Miscibility[1] (1:1) EC | Miscibility[1] (1:1) PC | Stability to lithium[2] 20° C. | Stability to lithium[2] 80° C. | Viscosity[3] mm²/s (20° C.) |
|---|---|---|---|---|---|---|---|
| N,N-dimethylacetamide[4] | 165 | 70 | + | + | + | + | 2.2 |
| N,N-dimethyltrifluoroacetamide[5] | 135 | 78 | + | + | + | + | 1.1 |

TABLE 1-continued

| Compound | BP °C. | FP °C. | Miscibility[1] (1:1) | | Stability to lithium[2] | | Viscosity[3] mm²/s |
| --- | --- | --- | --- | --- | --- | --- | --- |
| | | | EC | PC | 20° C. | 80° C. | (20° C.) |
| N,N-diethyltrifluoroacetamide[5] | 158 | 81 | + | + | + | + | 1.4 |
| N-Trifluoracetylpyrrolidine[5] | 165 | 85 | + | + | + | + | 3.1 |

[1]Miscibility with propylene carbonate (PC) or ethylene carbonate (EC) at room temperature
[2]Metallic lithium remains bright, there is no reaction (20° C.: 72 hours, 80° C.: 8 hours)
[3]Automatic capillary viscometer, AVS 310, Schott Gerate
[4]Comparison substance
[5]Substance according to the invention The invention also includes secondary lithium batteries with enhanced safety, which are characterized in that they contain an electrolyte system according to the invention.

The invention also provides a method for enhancing the safety of a secondary lithium battery, which is characterized by the use of an electrolyte system according to the invention as the electrolyte.

Finally, the invention additionally relates to the use of compounds of general formula (I) in safety electrolyte systems for lithium batteries.

The following examples will illustrate the invention in further detail without limiting its scope.

To produce the electrolyte, the solvent components used therein were first prepared as follows:

Ethylene carbonate (>99%, Merck) was distilled in an oil pump vacuum (boiling point 85° to 95° C.); dehydrated for 3 days at 150° C. using an activated molecular sieve (Roth, pore size of 4 angstrom), and stored at 60° C. under dried argon. The argon, 99.996%, AGA, was first directed over copper-(I)-oxide [BASF] with argon W5 [mixture of 95% argon and 5% hydrogen, technical grade, AGA] at 150° C. to remove oxygen traces and then dried over an activated molecular sieve.

Propylene carbonate (purum, Aldrich) was distilled in an oil pump vacuum over a 1.5 m long metal-coated packed column (boiling point 64° to 66° C.) and stored at room temperature over an activated molecular sieve under dried argon. After purification and drying, the residual water content of the solvents was determined by the Karl-Fischer method (e.g., using the Mitsubishi CA05 automatic titration device). The water content should be less than 10 ppm.

The fluorinated solvent component was dried for a few days at room temperature over an activated molecular sieve under dried argon. The electrolyte solutions were produced by means of the Schlenk technique in a dried argon stream. The glass equipment which was used with protective gas connection was freed from any adhering moisture prior to use in a non luminous Bunsen burner flame, while repeatedly alternating argon purging and oil pump vacuum suction.

EXAMPLE 1

Production of a Safety Battery Electrolyte composed of N,N-dimethyltrifluoroacetamide with lithium bis(trifluoromethanesulfone)imide 28.7 g lithium bis(trifluoromethanesulfone)imide (0.01 mol) ("imide") was added to 70 ml N,N-dimethyltrifluoroacetamide and, after obtaining a clear solution, was made up to a volume of 100 ml by adding the same solvent. The conductivity of the resulting electrolyte was measured at −40° to +60° C. For the results see Table 2

EXAMPLE 2

Production of a Safety Battery Electrolyte composed of N,N-dimethyltrifluoroacetamide/ propylene carbonate (1:1) with lithium bis (trifluoromethanesulfone)imide.

28.7 g imide (0.1 mol) was dissolved in a 1:1 (V/V) mixture of N,N-dimethyltrifluoroacetamide and propylene carbonate (PC) and made up to a volume of 100 ml by adding the same mixture. The conductivity of this electrolyte was measured at −40° to +60°. The results are shown in Table 2.

EXAMPLE 3

Production of a Safety Battery Electrolyte composed of 2:1 (V/V) ethylene carbonate/N,N-dimethyltrifluoroacetamide with lithium hexafluorophosphate The electrolyte was produced in the same manner as in Example 2, but 0.1 mol LiPF$_6$ was used as the electrolyte salt and ethylene carbonate/N,N-dimethyltrifluoroacetamide at a ratio of 2:1 was used as the solvent. The conductivity of this electrolyte was determined at −60° to +60° C. The results are shown in Table 2.

EXAMPLE 4

Production of a Safety Battery Electrolyte composed of N,N-dimethyltrifluoroacetamide/ dimethoxyethane/ethylene carbonate and lithium hexafluorophosphate The electrolyte was produced in the same manner as in Example 2, but LiPF$_6$ was used as the electrolyte salt, which was dissolved in a 1:1:1 mixture of N,N-dimethyltrifluoroacetamide/dimethoxyethane/ethylene carbonate. The conductivity of this electrolyte was determined at −60° to +60° C. The results are shown in Table 2.

EXAMPLE 5

Production of a Safety Battery Electrolyte composed of N,N-dimethyltrifluoroacetamide with the Addition of Sulfur Dioxide Gas and lithium bis (trifluoromethanesulfone)imide 28.7 g (0.1 mol) of the imide was dissolved in 80 ml of the amide saturated with SO$_2$ gas and made up to a volume of 100 ml by adding more $SO_2$ saturated amide. The conductivity of the resulting electrolyte was determined at −60° to +60° C. The results are shown in Table 2.

TABLE 2

| Example No. | Conductivity [mS/cm] | | | |
| --- | --- | --- | --- | --- |
| | −10 [° C.] | 0 [° C.] | 25 [° C.] | 40 [° C.] |
| 1 | 3.5 | 4.3 | 6.6 | 8.1 |
| 2 | 2.3 | 3.2 | 5.6 | 7.2 |
| 3 | 7.2 | 7.9 | 8.5 | 10.8 |
| 4 | 10.2 | 12.1 | 13.8 | 17.1 |
| 5 | 5.6 | 6.8 | 9.5 | 11.0 |

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An electrolyte system for lithium batteries comprising at least one lithium-containing conductive salt and at least one electrolyte liquid, wherein said electrolyte liquid comprises an effective amount of at least one partially fluorinated amide corresponding to formula (I)

$$R^1CO—NR^2R^3 \quad (I)$$

wherein
  $R^1$ is
    a linear $C_1$–$C_6$ alkyl group in which at least one hydrogen atom is replaced by fluorine, or
    a branched $C_3$–$C_6$ alkyl group in which at least one hydrogen atom is replaced by fluorine, or
    a $C_3$–$C_7$ cycloalkyl group optionally substituted one or more times by a linear $C_1$–$C_6$ alkyl group or branched $C_3$–$C_6$ alkyl group or both in which at least one hydrogen atom of the cycloalkyl group or the optional linear or branched alkyl substituent or both is replaced by fluorine, and
  $R^2$ and R3
    independently represent an identical or different linear $C_1$–$C_6$ alkyl group, a branched $C_3$–$C_6$ alkyl group or a $C_3$–$C_7$-cycloalkyl group, or together with the amide nitrogen form a saturated five or six-member nitrogen-containing ring, or are joined with one or more additional N and/or O atom(s) to form a 4 to 7-member ring in which the additional N atoms present in the ring are optionally saturated with $C_1$–$C_3$ alkyl groups and the ring carbon atoms may also carry $C_1$–$C_3$ alkyl groups.

2. An electrolyte system according to claim 1, wherein $R^1$ is a partially fluorinated or perfluorinated straight chain alkyl group with 1 to 4 carbon atoms or a partially fluorinated or perfluorinated branched alkyl group with 3 or 4 carbon atoms.

3. An electrolyte system according to claim 1, wherein $R^1$ has the composition $C_nH_{2n+1-m}F_m$, where n=1 to 6 and m=1 to 13.

4. An electrolyte system according to claim 3, wherein $R^1$ has the composition $C_nH_{2n+1-m}F_m$, where n=1 to 4 and m=1 to 9.

5. An electrolyte system according to claim 1, wherein $R^2$ and $R^3$ represent identical or different linear $C_1$–$C_4$ alkyl or branched $C_3$–$C_4$ alkyl groups.

6. An electrolyte system according to claim 1, wherein $R^2$ and $R^3$ are joined via an additional nitrogen or oxygen atom to form a 5 or 6-member ring.

7. An electrolyte system according to claim 1, wherein said electrolyte system comprises from 2 to 100% by volume of an amide of formula I, relative to the volume of the entire electrolyte system.

8. An electrolyte system according to claim 7, wherein said electrolyte system comprises from 2 to 70% by volume of an amide of formula I, relative to the volume of the entire electrolyte system.

9. An electrolyte system according to claim 8, wherein said electrolyte system comprises from 3 to 40% by volume of an amide of formula I, relative to the volume of the entire electrolyte system.

10. An electrolyte system according to claim 1, further comprising at least one additional ingredient selected from the group consisting of carbonates, esters, lactones and nitrites.

11. An electrolyte system according to claim 10, wherein said additional ingredient comprises ethylene carbonate or propylene carbonate.

12. An electrolyte system according to claim 1, wherein said electrolyte system is saturated with $SO_2$ or $CO_2$.

13. An electrolyte system according to claim 1, further comprising at least one film-forming substance.

14. An electrolyte system according to claim 13, wherein said at least one film-forming substance comprises ethylene sulfite.

15. A secondary lithium battery comprising an electrolyte system comprising at least one lithium-containing conductive salt and at least one electrolyte liquid, wherein said electrolyte liquid comprises an effective amount of at least one partially fluorinated amide corresponding to formula (I)

$$R^1CO—NR^2R^3 \quad (I)$$

wherein
  $R^1$ is
    a linear $C_1$–$C_6$ alkyl group in which at least one hydrogen atom is replaced by fluorine, or
    a branched $C_3$–$C_6$ alkyl group in which at least one hydrogen atom is replaced by fluorine, or
    a $C_3$–$C_7$ cycloalkyl group optionally substituted one or more times by a linear $C_1$–$C_6$ alkyl group or branched $C_3$–$C_6$ alkyl group or both in which at least one hydrogen atom of the cycloalkyl group or the optional linear or branched alkyl substituent or both is replaced by fluorine, and
  $R^2$ and R3
    independently represent an identical or different linear $C_1$–$C_6$ alkyl group, a branched $C_3$–$C_6$ alkyl group or a $C_3$–$C_7$-cycloalkyl group, or together with the amide nitrogen form a saturated five or six-member nitrogen-containing ring, or are joined with one or more additional N and/or O atom(s) to form a 4 to 7-member ring in which the additional N atoms present in the ring are optionally saturated with $C_1$–$C_3$ alkyl groups and the ring carbon atoms may also carry $C_1$–$C_3$ alkyl groups.

16. A method for enhancing the safety of a secondary lithium battery comprising the step of incorporating in said battery an electrolyte system according to claim 1.

17. A method of preparing an electrolyte system for a lithium battery comprising at least one lithium-containing conductive salt and at least one electrolyte liquid, said method comprising incorporating in said electrolyte liquid an effective amount of at least one partially fluorinated amide corresponding to formula (I)

$$R^1CO\text{—}NR^2R^3 \qquad (I)$$

wherein

R¹ is
- a linear $C_1$–$C_6$ alkyl group in which at least one hydrogen atom is replaced by fluorine, or
- a branched $C_3$–$C_6$ alkyl group in which at least one hydrogen atom is replaced by fluorine, or
- a $C_3$–$C_7$ cycloalkyl group optionally substituted one or more times by a linear $C_1$–$C_6$ alkyl group or branched $C_3$–$C_6$ alkyl group or both in which at least one hydrogen atom of the cycloalkyl group or the optional linear or branched alkyl substituent or both is replaced by fluorine, and R² and R3
- independently represent an identical or different linear $C_1$–$C_6$ alkyl group, a branched $C_3$–$C_6$ alkyl group or a $C_3$–$C_7$-cycloalkyl group, or together with the amide nitrogen form a saturated five or six-member nitrogen-containing ring, or are joined with one or more additional N and/or O atom(s) to form a 4 to 7-member ring in which the additional N atoms present in the ring are optionally saturated with $C_1$–$C_3$ alkyl groups and the ring carbon atoms may also carry $C_1$–$C_3$ alkyl groups.

* * * * *